(12) United States Patent
Heller et al.

(10) Patent No.: US 11,286,184 B2
(45) Date of Patent: Mar. 29, 2022

(54) SYSTEM AND METHOD FOR TREATING A BODY OF MATTER WITH OXYGEN TREATED GAS

(71) Applicants: Jonathan Jacob Heller, Jerusalem (IL); Tomer Jay Levy, Bet Shemesh (IL); POOL PURITY LTD, Jerusalem (IL)

(72) Inventors: Jonathan Jacob Heller, Jerusalem (IL); Tomer Jay Levy, Bet Shemesh (IL)

(73) Assignees: POOL PURITY LTD., Jerusalem (IL); Jonathan Jacob Heller, Jerusalem (IL); Tomer Jay Levy, Bet Shemesh (IL)

( * ) Notice: Subject to any disclaimer, the term of this patent is extended or adjusted under 35 U.S.C. 154(b) by 380 days.

(21) Appl. No.: 16/304,689

(22) PCT Filed: Jun. 26, 2017

(86) PCT No.: PCT/IB2017/053793
§ 371 (c)(1),
(2) Date: Nov. 27, 2018

(87) PCT Pub. No.: WO2018/002806
PCT Pub. Date: Jan. 4, 2018

(65) Prior Publication Data
US 2020/0325047 A1    Oct. 15, 2020

Related U.S. Application Data

(60) Provisional application No. 62/356,201, filed on Jun. 29, 2016.

(51) Int. Cl.
C02F 1/32    (2006.01)
C02F 1/48    (2006.01)
(Continued)

(52) U.S. Cl.
CPC .............. *C02F 1/727* (2013.01); *C02F 1/325* (2013.01); *C02F 1/481* (2013.01); *C02F 1/78* (2013.01);
(Continued)

(58) Field of Classification Search
CPC .. C02F 1/325; C02F 1/48; C02F 1/481; C02F 1/727; C02F 1/78; C02F 2201/3223; C02F 2201/782; C02F 2305/023
See application file for complete search history.

(56) References Cited

U.S. PATENT DOCUMENTS 4,214,962 A    7/1980  Pincon
4,563,286 A    1/1986  Johnson et al.
(Continued)

FOREIGN PATENT DOCUMENTS

CA    2430382    6/2002
CA    2803926    10/2012
(Continued)

*Primary Examiner* — Bradley R Spies
(74) *Attorney, Agent, or Firm* — The Law Office of Joseph L. Felber

(57) ABSTRACT

A generator (100, 101, 102, 103, 104, 105, 106, 107, 108, 109) is used for producing a treated oxygen containing gas for treating a body of matter (11). The generator (100, 101, 102, 103, 104, 105, 106, 107, 108, 109) extends along a generator axis and has an axially extending hollow sleeve (12) defining an internal space (14). At least one lid (16) is located at one of the axial ends of the sleeve (12) and a UV light source (18) and at least one magnet (20) are located along the axis.

16 Claims, 14 Drawing Sheets

(51) Int. Cl.
  *C02F 1/72* (2006.01)
  *C02F 1/78* (2006.01)
  *C02F 101/30* (2006.01)
  *C02F 101/32* (2006.01)
  *C02F 101/36* (2006.01)

(52) U.S. Cl.
  CPC .. *C02F 2101/306* (2013.01); *C02F 2101/322* (2013.01); *C02F 2101/36* (2013.01); *C02F 2201/3222* (2013.01); *C02F 2201/3223* (2013.01); *C02F 2201/3227* (2013.01); *C02F 2201/483* (2013.01); *C02F 2201/782* (2013.01); *C02F 2305/023* (2013.01)

(56) References Cited

U.S. PATENT DOCUMENTS

| | | | |
|---|---|---|---|
| 5,223,105 A | 6/1993 | Arthurson | |
| 5,622,622 A | 4/1997 | Johnson | |
| 5,675,153 A | 10/1997 | Snowball | |
| 5,732,654 A | 3/1998 | Perez et al. | |
| 6,478,953 B2 | 11/2002 | Spearman et al. | |
| 8,361,384 B1 | 1/2013 | Kolstad | |
| 8,696,915 B2 | 4/2014 | Klochkoff et al. | |
| 9,187,344 B2 | 11/2015 | Kolstad | |
| 9,321,665 B2 | 4/2016 | Kolstad et al. | |
| 2002/0063087 A1 | 5/2002 | Spearman et al. | |
| 2006/0159558 A1* | 7/2006 | Tessien | B01D 19/0036 417/313 |
| 2007/0207672 A1* | 9/2007 | Takagi | B06B 1/045 439/607.01 |
| 2011/0097816 A1* | 4/2011 | Goodwin | G01N 1/4077 436/178 |
| 2011/0215037 A1* | 9/2011 | Cassassuce | B01D 35/14 210/95 |
| 2012/0261349 A1 | 10/2012 | Kolstad et al. | |
| 2013/0087504 A1 | 4/2013 | Kolstad | |
| 2015/0136709 A1 | 5/2015 | Kolstad et al. | |
| 2016/0083275 A1 | 3/2016 | Kolstad | |

FOREIGN PATENT DOCUMENTS

| | | |
|---|---|---|
| DE | 202013100329 | 3/2013 |
| EP | 1347814 | 6/2010 |
| EP | 2697168 | 1/2018 |
| FR | 2979835 | 3/2013 |
| JP | 2011110471 | 6/2011 |
| WO | 2005061388 | 7/2005 |
| WO | 2006027659 | 3/2006 |
| WO | 2012142140 | 10/2018 |

* cited by examiner

SYSTEM AND METHOD FOR TREATING A BODY OF MATTER WITH OXYGEN TREATED GAS

TECHNICAL FIELD

Embodiments of the invention relate to a system and method for treating a body of matter, and in particular to a generator component for use therein.

BACKGROUND

Various bodies of matter may require treatment for e.g. removing contaminations present therein. Such bodies of matter may include for example gasses such as air in substantial enclosed environments that may accumulate contaminants such as mold, bacteria or the like. Other bodies of matter may include liquids such as water that may also accumulate contaminants.

In the example of a body of water, treatment of such matter may be carried out in a wide variety of industrial and commercial applications, such as in purification of drinking water, recovery of wastewater from domestic, industrial, commercial or agricultural activities, descaling of boiler and cooling tower heat exchange water systems, purification of hot tub spa and swimming pool water, (etc.).

Chemical additives that can be used in treatment of such a body of matter for disinfection, descaling, detoxification or the like; may be categorized as biocides, algaecides, fungicides, scale inhibitors, (etc.). Some problems, however, associated with "purification" resulting from chemical based treatment may be excessive use of chemicals resulting in high chemical concentration within the treated body of matter, un-intentional chemical reactions occurring during use resulting in corrosive or dangerous chemical compounds left remaining within the matter that may have negative effect on humans, (etc.). Thus, bodies of matter may be treated by processes that either leave unwanted compounds in the matter or are less effective in the treatment process.

Advanced Oxidation Processes (AOP) can be used for treating bodies of matter such as in purifying water. This procedure relies on affecting properties of an incoming gas stream for production of highly reactive oxidants that can be applied to oxidize compounds present in the body of matter. The AOP procedure at least in some applications may be particularly effective in cleaning for example chemical and/or biologically toxic or non-degradable materials such as aromatics, pesticides, petroleum constituents, and volatile organic compounds. In the example of a body of matter of waste water, treatment by AOP procedures may reduce chemical contaminants and toxins so that e.g. the cleaned waste water may be re-used at least to a certain extent.

An example of an AOP type arrangement can be seen in U.S. Pat. No. 4,563,286 describing a water purification arrangement that uses as the water treating agent ionized oxygen allotrope gas in multiple (multivalent) ion charge forms produced from ambient atmospheric air. The arrangement has a gas flow path having multivalent oxygen ion allotrope forming sites that each include a magnetic flux field energy zone within the ambient air flow path characterized by interacting multi-polar magnets that exert flux fields across the flow path, and one or more elongate oxygen photolysis lamps enveloping the flux with ultraviolet light wave length ionizing electron-volt radiant energy emissions. The ambient atmospheric air is passed in a continuous flow through the flow path and then is conveyed to and is interspersed in the water to be treated.

Another example of an AOP type arrangement can be seen in U.S. Pat. No. 8,361,384 that describes a water treatment device for treating cooling tower water. The water treatment device utilizes a UV light source for emitting ultraviolet radiation, a magnetic field formed from rod like magnet components extending parallel alongside the UV light source, and ozone fortified air to treat cooling tower water; resulting in reduced microbial contamination and reduced alkalinity in cooling tower water.

Yet a further example can be seen in U.S. Pat. No. 4,214,962 describing activated oxygen produced by irradiating oxygen with electromagnetic radiation, resulting in high oxidation potential and spectral properties. The activated oxygen may be used to treat water in order to reduce surface tension, oxidize wastes, reduce manganous ion concentration, and disinfect water without creating carcinogens.

Existing AOP solutions thus include an interior treatment cell for housing components such as the magnets and the UV light source. In many cases however these components are arranged in a configuration, such as a side by side configuration along the gas flow path, which increases the size of the cell. In addition, placing all the components within the treatment cell may hinder maintenance to such systems in case of failure and the need to replace one of the components, and may complicate manufacturing and assembly of such systems and may expose components within the cell to corrosion.

It is thus an objective of at least some embodiments of the present invention to provide an improved AOP type system and/or method and/or improvements in components used in AOP type system; for the purpose of addressing at least some of these aspects.

SUMMARY

The following embodiments and aspects thereof are described and illustrated in conjunction with systems, tools and methods which are meant to be exemplary and illustrative, not limiting in scope.

In an aspect of the invention there is provided an embodiment of a generator for producing a treated oxygen containing gas for treating a body of matter, the generator extending along a generator axis and comprising an axially extending hollow sleeve defining an internal space, at least one lid located at one of the axial ends of the sleeve, a UV light source located along the axis and at least one magnet located along the axis.

It has been found that said treatment of the body of matter may include in some cases cleaning for example chemical and/or biologically toxic or non-degradable materials such as aromatics, pesticides, petroleum constituents, and volatile organic compounds from various bodies of matter. In the example of a body of matter of waste water, treatment by various generator embodiments of the invention has been found to possibly reduce chemical contaminants and toxins so that e.g. the cleaned waste water may be re-used at least to a certain extent.

Various generator embodiments of the invention have also been found to be effective in oxidizing, inter alia, algae. For example in tests performed in a natural pond having algae growth, various tested embodiments of generators of the invention have been found to destroy the algae and make it much easier for removal. Typically, a vacuum machine is used for removing algae however often encountering difficulty in said removal due to the algae being stuck e.g. to walls of a container of the body of matter. It has been found that treatment with various tested generator embodiments has also made the algae less elastic/sticky/tacky thus allowing effective vacuum of said algae for its removal.

Possibly, the internal space defining a flow path and oxygen containing gas entering the generator flows via the flow path to be irradiated with UV radiation emitted by the UV light source in the presence of an induced magnetic field from the at least one magnet to form the treated oxygen containing gas exiting the generator for treating the body of matter.

Typically, the UV light source extends along the axis.

Preferably, the at least one magnet is at least two magnets, and wherein one of the magnets being located at one axial side or end of the UV light source and another one of the magnets being located at an opposing axial side or end of the UV light source. That is to say that embodiments of the generator may include instead of only one magnet two or more magnets.

Preferably, the at least one lid is two lids, and each axial end of the sleeve being closed by a lid. That is to say that embodiments of the generator may include instead of only one lid (possibly a detachable lid) two or more such lids.

In an aspect of the invention there is also provided a method for producing a treated oxygen containing gas for treating a body of matter comprising the steps of: providing, a generator extending along an axis and comprising an axially extending hollow sleeve defining an internal space, at least one lid located at one of the axial ends of the sleeve, a UV light source located along the axis and at least one magnet located along the axis, directing an oxygen containing gas through the internal space to be irradiated with UV radiation emitted by the UV light source in the presence of an induced magnetic field from the at least one magnet to form the treated oxygen containing gas, and directing the treated oxygen containing gas into a body of matter.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
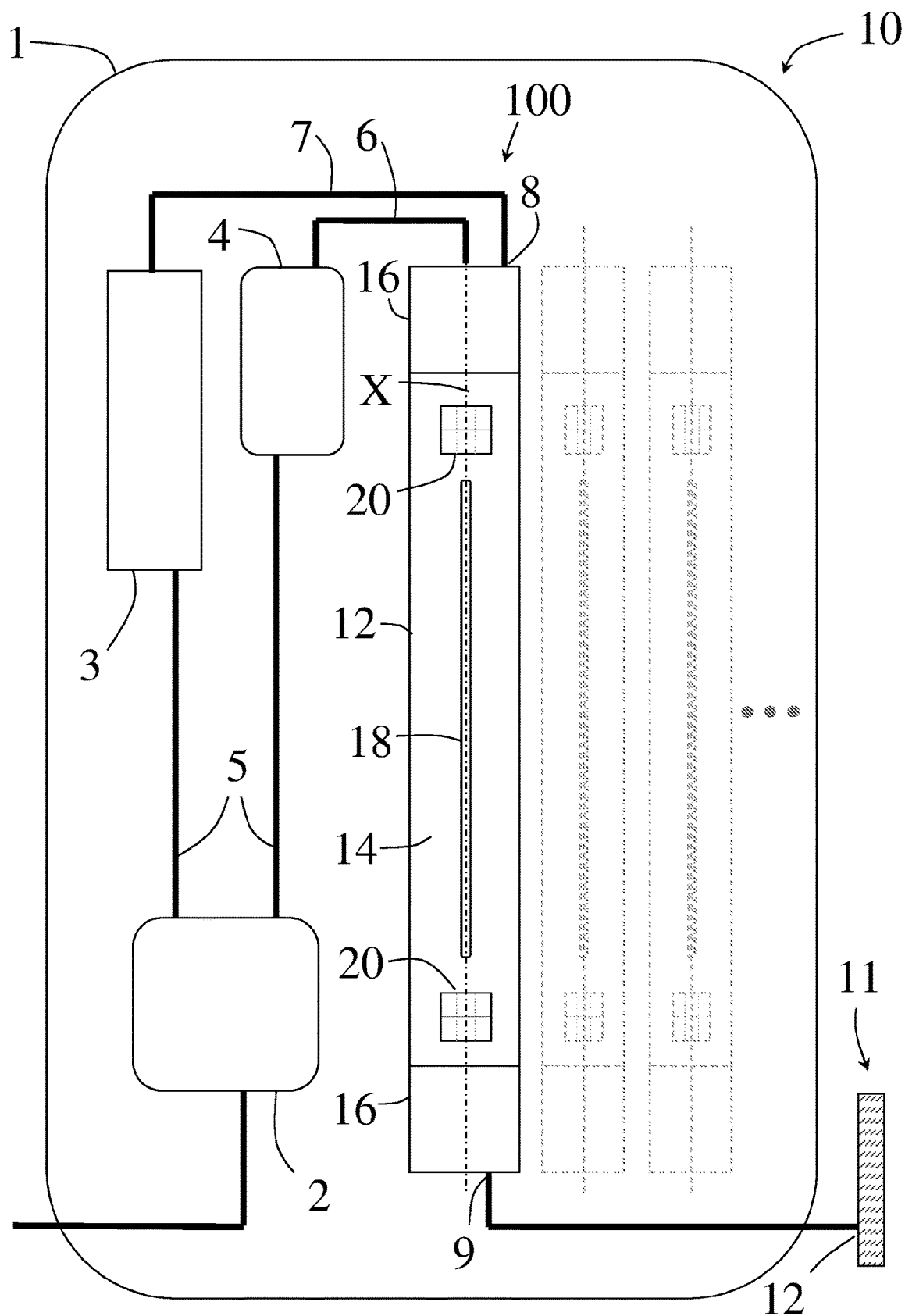
FIG. 1 schematically illustrates a system according to an embodiment of the present invention for treating a body of matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically showing basic components of a system 100 for treating a body of matter according to various embodiments of the present invention. System 100 is, at least in part, of an Advanced Oxidation Processes (AOP) type; here seen being located in a possible cabinet 1 housing a main switch 2, an optional pump or compressor 3, a ballast 4 and a generator 100. Generator 100 may take various forms according to various embodiments, at least some of which discussed in relation to the following figures. With respect to the generator seen in FIG. 1, the following general structure will be discussed, which may apply at least to some of the generator embodiments seen in the figures.

Generator 100 has an axis X and includes an axially extending hollow sleeve 12 defining an interior space 14. Possibly sleeve is cylindrically shaped about axis X however other forms may also be applicable. Generator 100 in addition has two lids 16 each located at a respective one of the axial ends of the sleeve. Generator 100 includes within space 14 an ultraviolet (UV) radiation or light source 18 that generally extends along axis X and a plurality of magnets, here two magnets 20, being located here at opposite axial sides of the UV source 18. Lids referred to herein preferably refer to removable and/or detachable lids capable of being attached and detached from a respective end of a sleeve where they are located.

A suitable UV source 18 for at least some embodiments of the present invention typically transmits electromagnetic radiation having wavelength in a range from about 40 nm to about 400 nm. The UV light source, although not shown, may include any required component such as electrodes at respective one or more ends of same, helical spring type seats for contacting the electrodes e.g. to the lids (etc.) to form electrical contact between UV source 18 and the ballast. In a possible case where UV source 18 may be made of diodes emitting UV radiation, a suitable power source may replace the ballast.

The magnets 20 may be arranged in the generator with like poles being oriented toward each so as to repel each other. For example, the south poles of the magnets may be arranged facing each other or the north poles of the magnets may be arranged facing each other. Alternatively, the magnets may be arranged with opposing poles facing each other.

In a non-binding example, components suitable for providing UV radiation in at least some embodiments of the invention may include an ultraviolet lamp such as the GPH 357 T5 VH4 UV and a ballast such as the SURELIGHT 10-05-04B both offered commercially by Atlantic Ultraviolet USA. Suitable magnets for at least some embodiments of the present invention may be cylindrically shaped neodymium (Neodymium-Iron-Boron) grade N52 having a magnetic flux density of 3500-3600 gauss or higher.

In system 10, electric circuitry entering cabinet reaches main switch 2 where it is supplied via cables 5 to the ballast 4 and to the optional pump 3. Ballast 4 forwards regulated electrical current via cable 6 to UV source 18 and pump 3 provides pressurized oxygen containing gas flow via conduit 7 to an inlet 8 of generator 100. Preferably the oxygen containing gas flow is an ambient air flow containing atmospheric oxygen.

The oxygen containing gas stream drawn into generator 100 flows passed magnets 20 and the UV source 18 consequently being irradiated with UV radiation within an induced magnetic field to form a treated oxygen containing gas flow that exits generator 100 via an outlet 9 of the generator. The treated oxygen containing gas flow exhausted through outlet 9 can be supplied to a body of matter 11 to be treated.

In accordance with an aspect of the present invention, placing components of the generator along axis X, such as in the case of the magnets and UV source, facilitates formation of a compact generator arrangement. Such a compact arrangement may be characterized as being snuggly formed about axis X with substantially no components set laterally aside away from axis X to extend or be positioned alongside axis X. For example, in embodiments where UV light source is located along axis X substantially no components of the generator are located extending alongside the UV light source 18.

Such a compact arrangement may facilitate providing systems in accordance with at least some embodiments of the present invention with a scalable arrangement capable of placing multiple generators alongside each other as illustrated by the dashed gray representations of generators on the right side of FIG. 1. Such multiple generators, positioned with their axes possibly substantially parallel to each other, may increase throughput and/or output of a system according to an embodiment in treatment of a body of matter by providing multiple parallel exiting streams of treated oxygen containing gas that are then fed to the body of matter.

In cases where the body of matter 11 is in a flowing motion such as a flowing body of water in a pipe, a venturi tube may be placed e.g. at a junction 12 with the body of matter in communication (e.g. liquid and/or fluid communication) with the flow to urge treated gas to be sucked out of the system and into the flow. In such a case, the system may not require pump 3.

In a non-binding example, flow rate of treated oxygen containing gas suitable for treating various bodies of matter may range, depending on the body of matter, at least in some cases between about 4 to about 18 liters per minute and possibly higher.

The material of either one of the sleeve and lids may be formed from metallic materials such as stainless steel, aluminum, or the like; or non-metallic materials, such as plastics and/or thermoplastics e.g. polyvinyl chloride (PVC), polyamide compounds (e.g. akulon trade name), synthetic polymers (e.g. delrin trade name), or the like. For example, in an embodiment of the invention, the material of the sleeve may be formed from metallic material such as aluminum, while the material of the lid from non-metallic such as a polyamide. Such choice of materials may form a sleeve with relative high dissipation to heat permitting heat created by the UV source to be expelled out of the sleeve, while exhibiting relatively high resistance to passage of magnetic flux there through. The lid on the other hand in such an embodiment may have relative low dissipation to heat, while substantially not resisting passage of magnetic flux there through.

An aspect of the present invention may thus be directed to an embodiment of a generator having a metallic sleeve with a UV light source, at least most of which is located therein, and at least one magnet attached or coupled to a non-metallic lid plugging the sleeve where at least parts of the lid are located between the magnet and an inner space of the sleeve. Such construction provides for a fluid passage forming sleeve dissipating heat formed by the UV light source outwards from the sleeve, while magnetic flux flows with substantially no resistance through the lid material to the inner space. Orientation of the UV light source and magnets may be along an axis about which the sleeve is formed for providing compactness (i.e. in order to make the generator compact).

Figure 2:
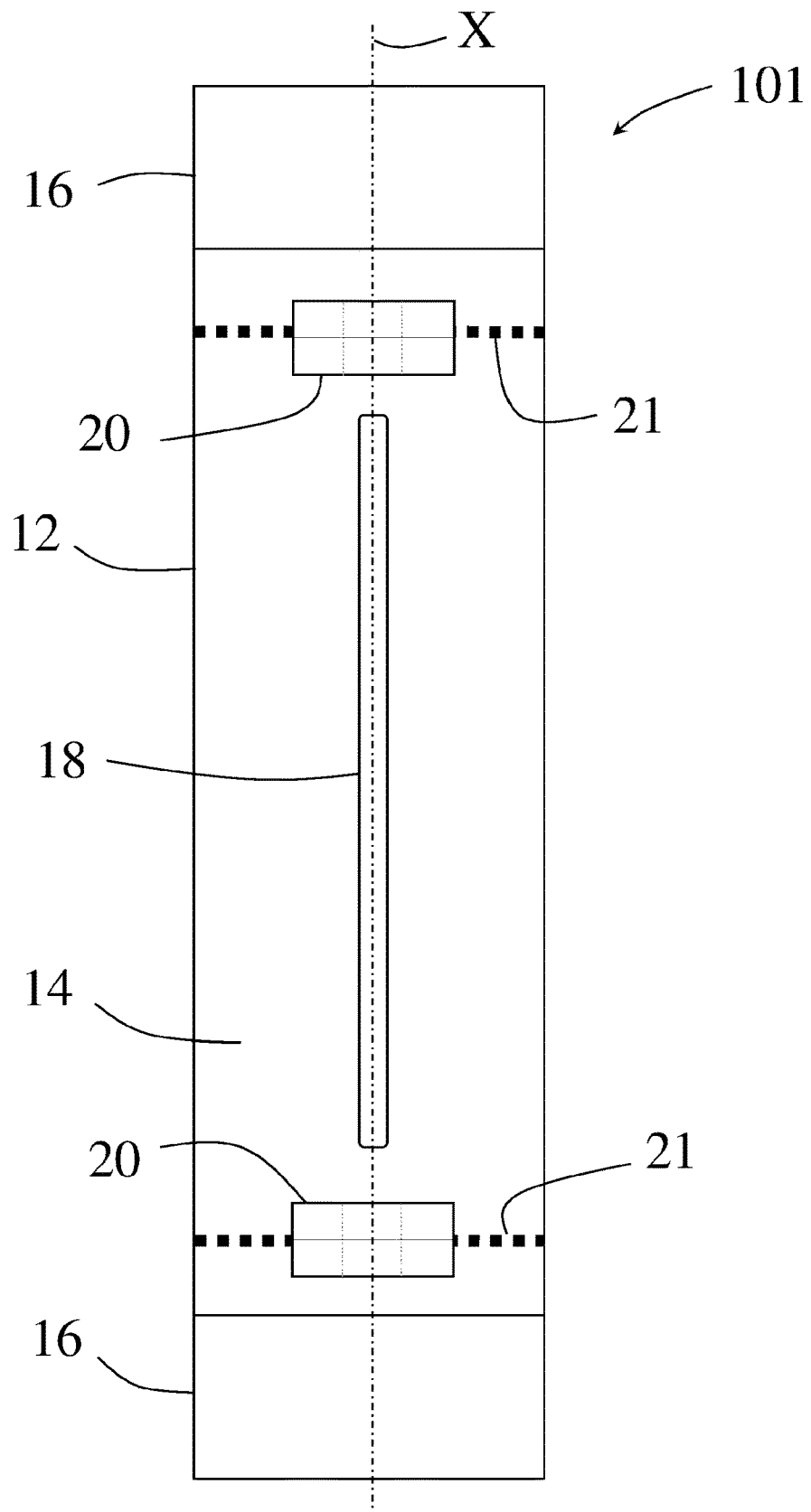
FIGS. 2 to 17 schematically illustrate various generator embodiments possibly used in a system according to an embodiment of the present invention.

Attention is drawn to FIG. 2 schematically illustrating a generator 101 in accordance with an embodiment of the present invention that may be used in a system such as system 100 in FIG. 1 or systems generally like it. Generator 101 in this embodiment may have a structure generally similar to generator 100 with the magnets, here two, being located at opposing axial sides of the UV light source possibly within space 14. In the example shown, generator 100 includes seating means in this example in the form of a flange or clasp 21 here supported at one end to sleeve 12 for holding the magnets in space 14.

An incoming oxygen containing gas entering generator 101 flows passed magnets 20 and the UV source 18 consequently being irradiated with UV radiation within an induced magnetic field to form a treated oxygen containing gas flow that exits generator 101 for treating a body of matter. The oxygen containing gas on its route flows via possible passages formed in the seats 21. Possibly, the seats may be in the form of one or more rod-like members with passages formed there between.

Figure 3:
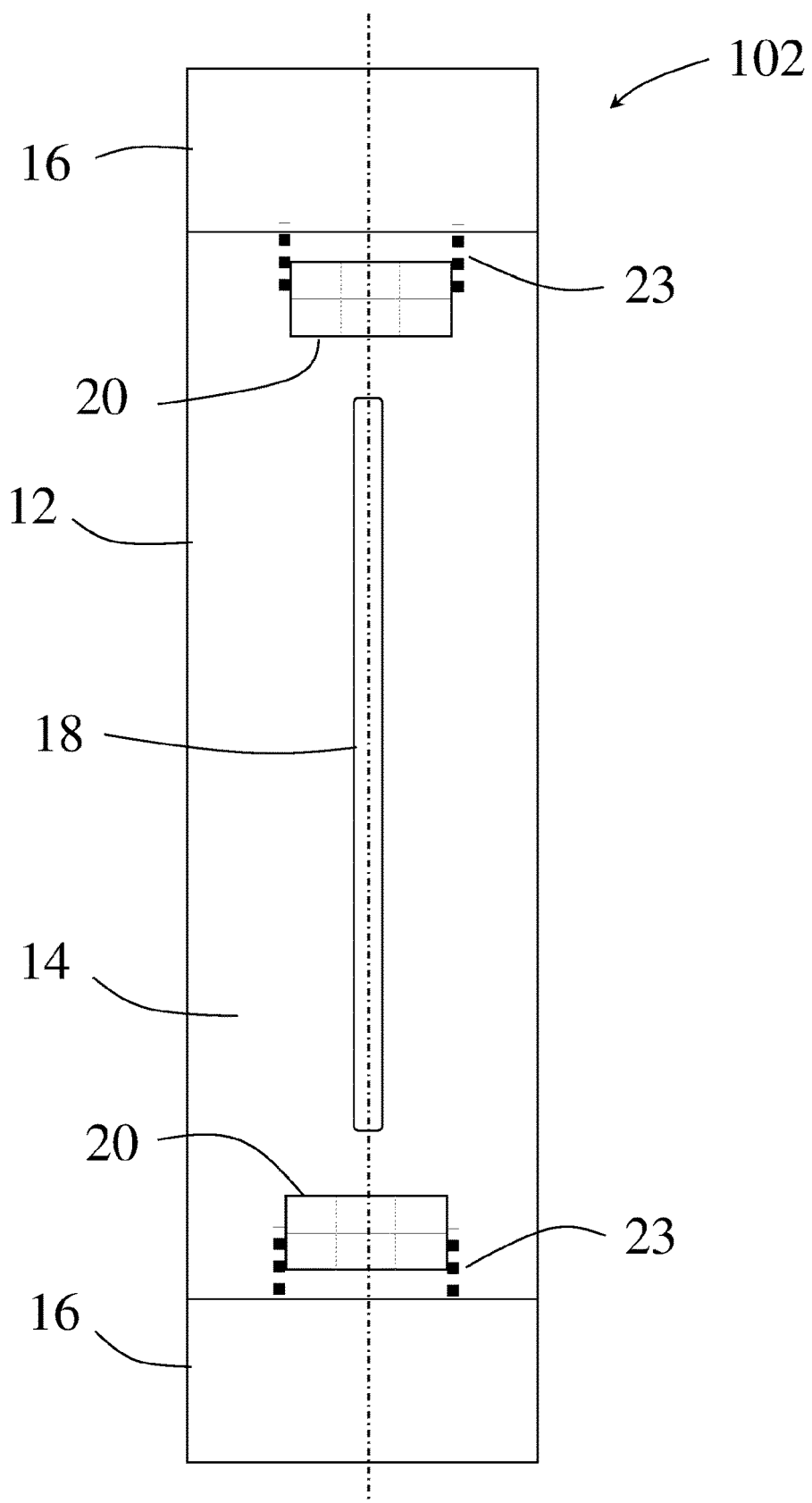

Attention is drawn to FIG. 3 schematically illustrating a generator 102 in accordance with an embodiment of the present invention that may be used in a system such as system 100 in FIG. 1 or systems generally like it. Generator 102 in this embodiment may have a structure generally similar to generator 100 with the magnets, here two, being located at opposing axial sides of the UV light source possibly within space 14. In the example shown, generator 102 includes seating means in this example in the form of one or more fingers 23 here each supported at one end to a respective lid 16 for holding the magnets in space 14.

An incoming oxygen containing gas entering generator 102 flows passed magnets 20 and the UV source 18 consequently being irradiated with UV radiation within an induced magnetic field to form a treated oxygen containing gas flow that exits generator 102 for treating a body of matter.

Figure 4:
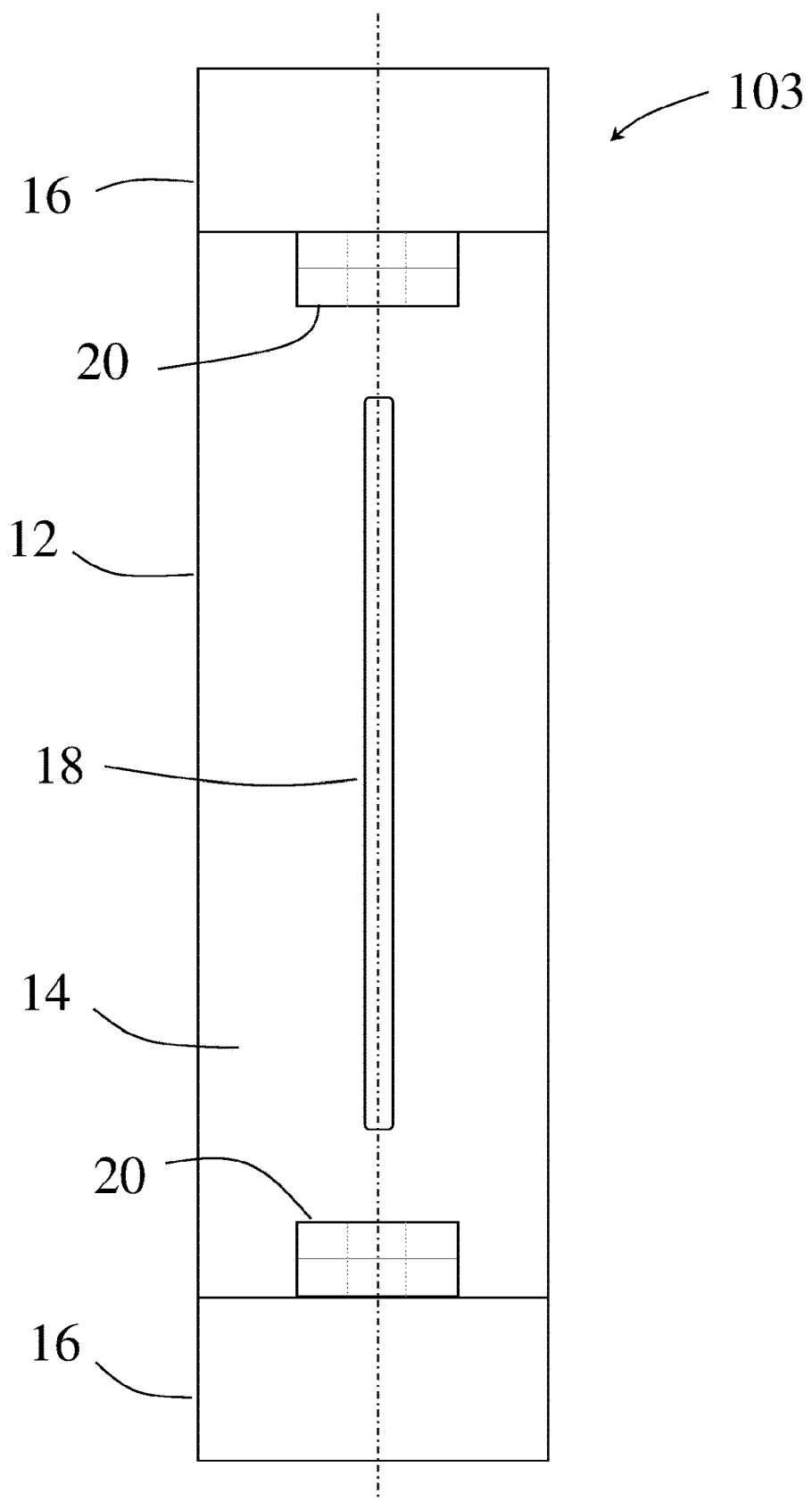

Attention is drawn to FIG. 4 schematically illustrating a generator 103 in accordance with an embodiment of the present invention that may be used in a system such as system 100 in FIG. 1 or systems generally like it. Generator 103 in this embodiment may have a structure generally similar to generator 100 with the magnets, here two, being located at opposing axial sides of the UV light source possibly attached each to a respective lid 16.

An incoming oxygen containing gas entering generator 103 flows passed magnets 20 and the UV source 18 consequently being irradiated with UV radiation within an induced magnetic field to form a treated oxygen containing gas flow that exits generator 103 for treating a body of matter.

Figure 5:
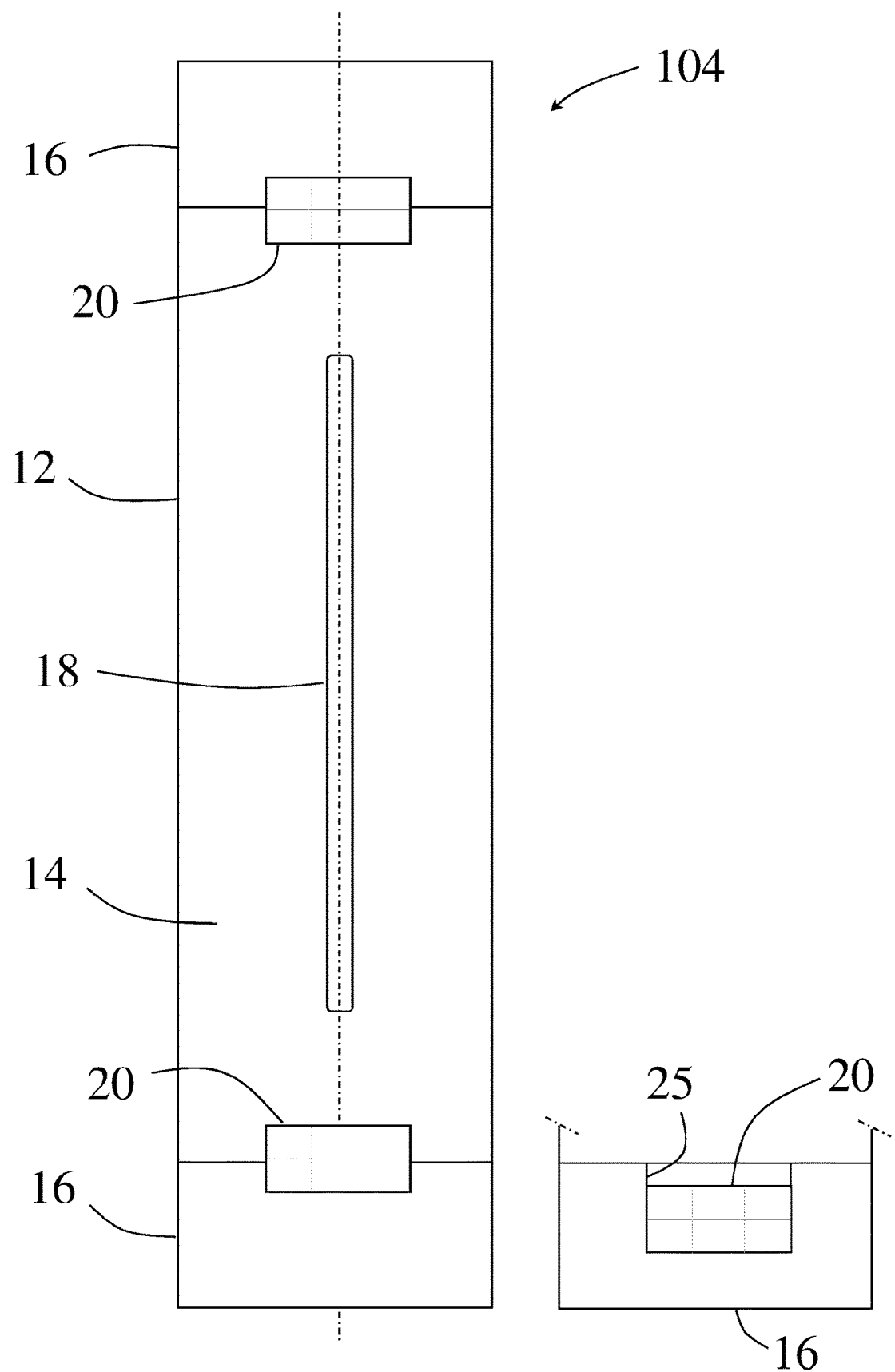

Attention is drawn to FIG. 5 schematically illustrating a generator 104 in accordance with an embodiment of the present invention that may be used in a system such as system 100 in FIG. 1 or systems generally like it. Generator 104 in this embodiment may have a structure generally similar to generator 100 with the magnets, here two, being located at opposing axial sides of the UV light source possibly located in respective recesses formed in each lid 16 and opening into space 14.

An incoming oxygen containing gas entering generator 104 flows passed magnets 20 and the UV source 18 consequently being irradiated with UV radiation within an induced magnetic field to form a treated oxygen containing gas flow that exits generator 104 for treating a body of matter. Each magnet in its respective recess in the lid may be positioned such that it projects beyond an inner face of the lid into space 14 (as shown), may possibly be flush with the lid's inner face (not shown) or may be fully located within the lid set back from the lids inner face within a deep recess 25 opening into space 14 (see illustrated in the single lid shown at the lower right side of FIG. 5).

Figure 6:
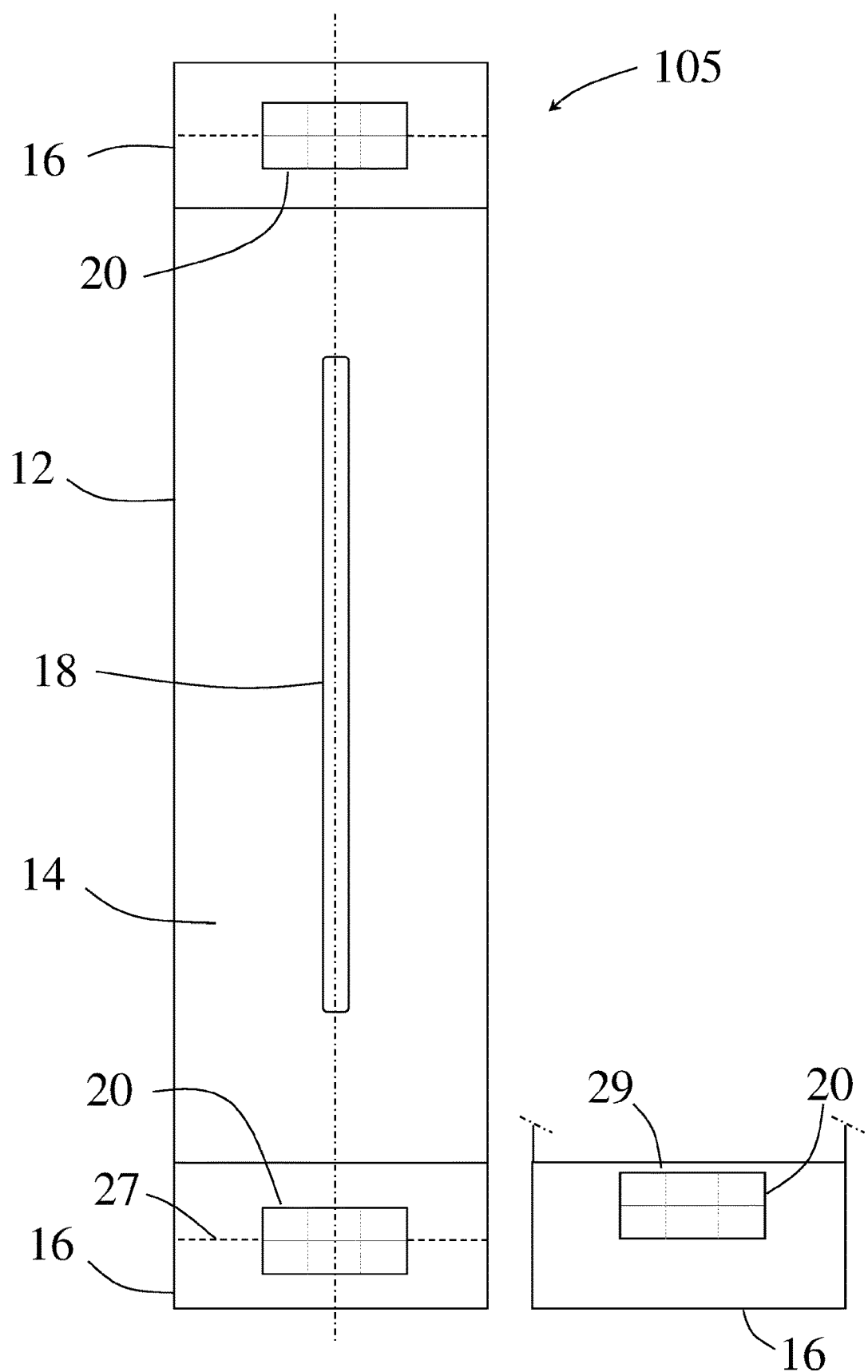

Attention is drawn to FIG. 6 schematically illustrating a generator 105 in accordance with an embodiment of the present invention that may be used in a system such as system 100 in FIG. 1 or systems generally like it. Generator 105 in this embodiment may have a structure generally similar to generator 100 with the magnets, here two, being located at opposing axial sides of the UV light source possibly located in respective pockets formed in each lid 16. The pockets may be formed as recesses in the lids into which the magnets are entered or inserted and then closed by a seal and/or covered by a cap. Alternatively, the lids may be integrally formed with the magnets located therein. Further options may include forming each lid from two parts sandwiching there between a respective magnet, with a border line between two such parts being illustrated by dashed line 27. Further, the magnet may be formed in each lid more proximal to one axial side of the lid, such as more proximal to an axial inner side of the lid leaving a thin layer 29 of the lid between the magnet and inner space 14 (see illustrated in the single lid shown at the lower right side of FIG. 6).

Locating a magnet within a lid simplifies and eases assembly and maintenance of the generator. It also protects the magnet from damage and corrosion occurring for example due to UV radiation and/or moist air e.g. within space 14. Placing a magnet within a lid in a position more proximal to the generator's inner space (an example seen accordingly in the lower right side of FIG. 6) may increase the strength of the magnetic flux within the inner space 14 while still providing protection to the magnet against corrosion.

Generator embodiments including a magnet within a lid and/or portions of the lid between the magnet and the generator's inner space; may preferably be formed from non-metallic materials such as plastic polymers or the like that do not substantially affect the magnetic flux of the magnet.

An incoming oxygen containing gas entering generator 105 flows passed magnets 20 and the UV source 18 consequently being irradiated with UV radiation within an induced magnetic field to form a treated oxygen containing gas flow that exits generator 105 for treating a body of matter.

Figure 7:
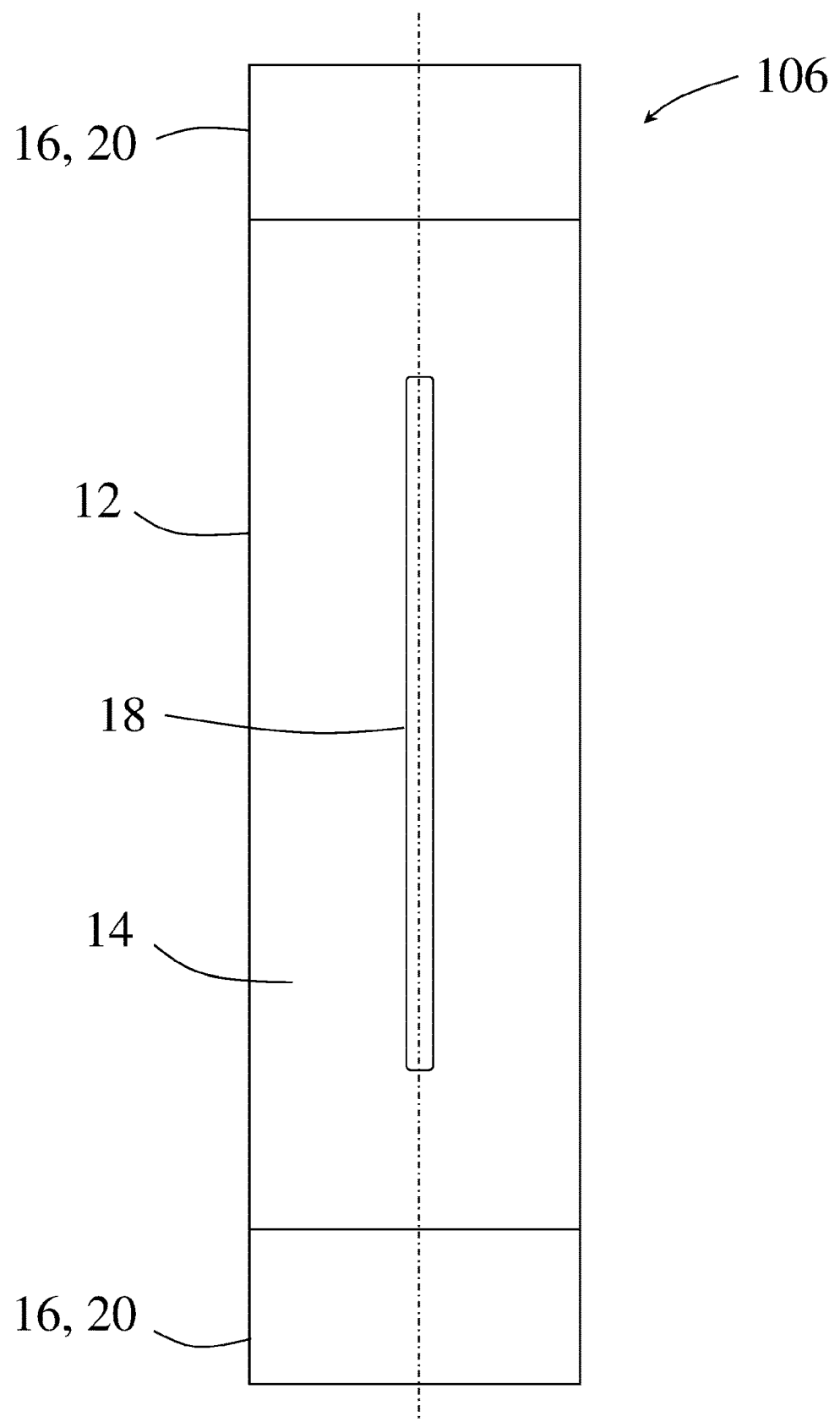

Attention is drawn to FIG. 7 schematically illustrating a generator 106 in accordance with an embodiment of the present invention that may be used in a system such as system 100 in FIG. 1 or systems generally like it. Generator 106 in this embodiment may have a structure generally similar to generator 100 with the lids 16 constituting the magnets 20 of this embodiment. The lids for example may be first machined to have their structure and then magnetized.

An incoming oxygen containing gas entering generator 106 flows passed magnets 20 and the UV source 18 consequently being irradiated with UV radiation within an induced magnetic field to form a treated oxygen containing gas flow that exits generator 106 for treating a body of matter.

Figure 8:
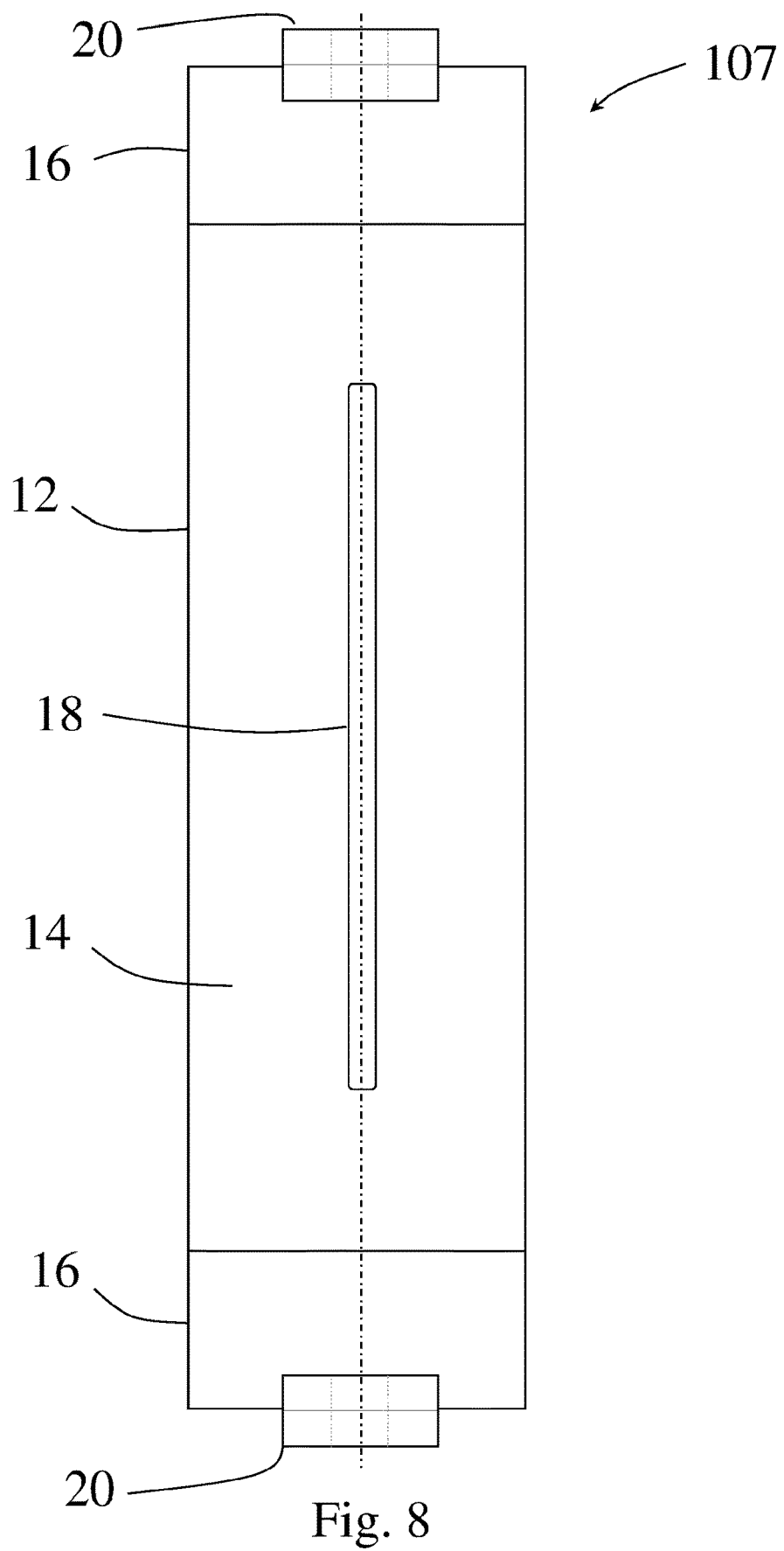

Attention is drawn to FIG. 8 schematically illustrating a generator 107 in accordance with an embodiment of the present invention that may be used in a system such as system 100 in FIG. 1 or systems generally like it. Generator 107 in this embodiment may have a structure generally similar to generator 100 with the magnets, here two, being located at opposing axial sides of the UV light source possibly located in respective recesses formed in each lid 16 and opening axially out of the generator.

An incoming oxygen containing gas entering generator 107 flows passed magnets 20 and the UV source 18 consequently being irradiated with UV radiation within an induced magnetic field to form a treated oxygen containing gas flow that exits generator 107 for treating a body of matter.

Figure 9:
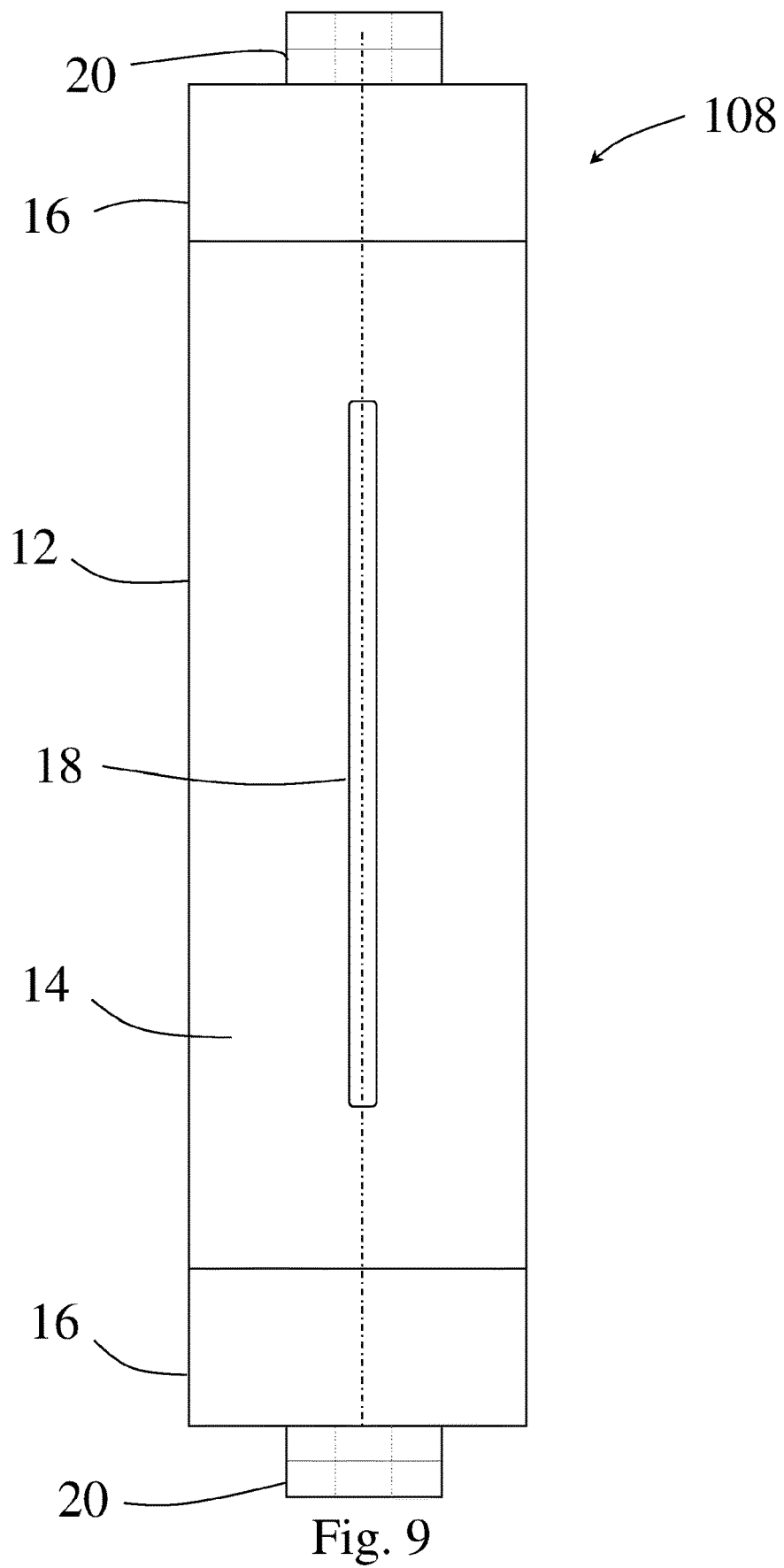

Attention is drawn to FIG. 9 schematically illustrating a generator 108 in accordance with an embodiment of the present invention that may be used in a system such as system 100 in FIG. 1 or systems generally like it. Generator 108 in this embodiment may have a structure generally similar to generator 100 with the magnets, here two, being located at opposing axial sides of the UV light source possibly located on respective axial outer sides of each lid 16.

An incoming oxygen containing gas entering generator 108 flows passed magnets 20 and the UV source 18 consequently being irradiated with UV radiation within an induced magnetic field to form a treated oxygen containing gas flow that exits generator 108 for treating a body of matter.

Figure 10:
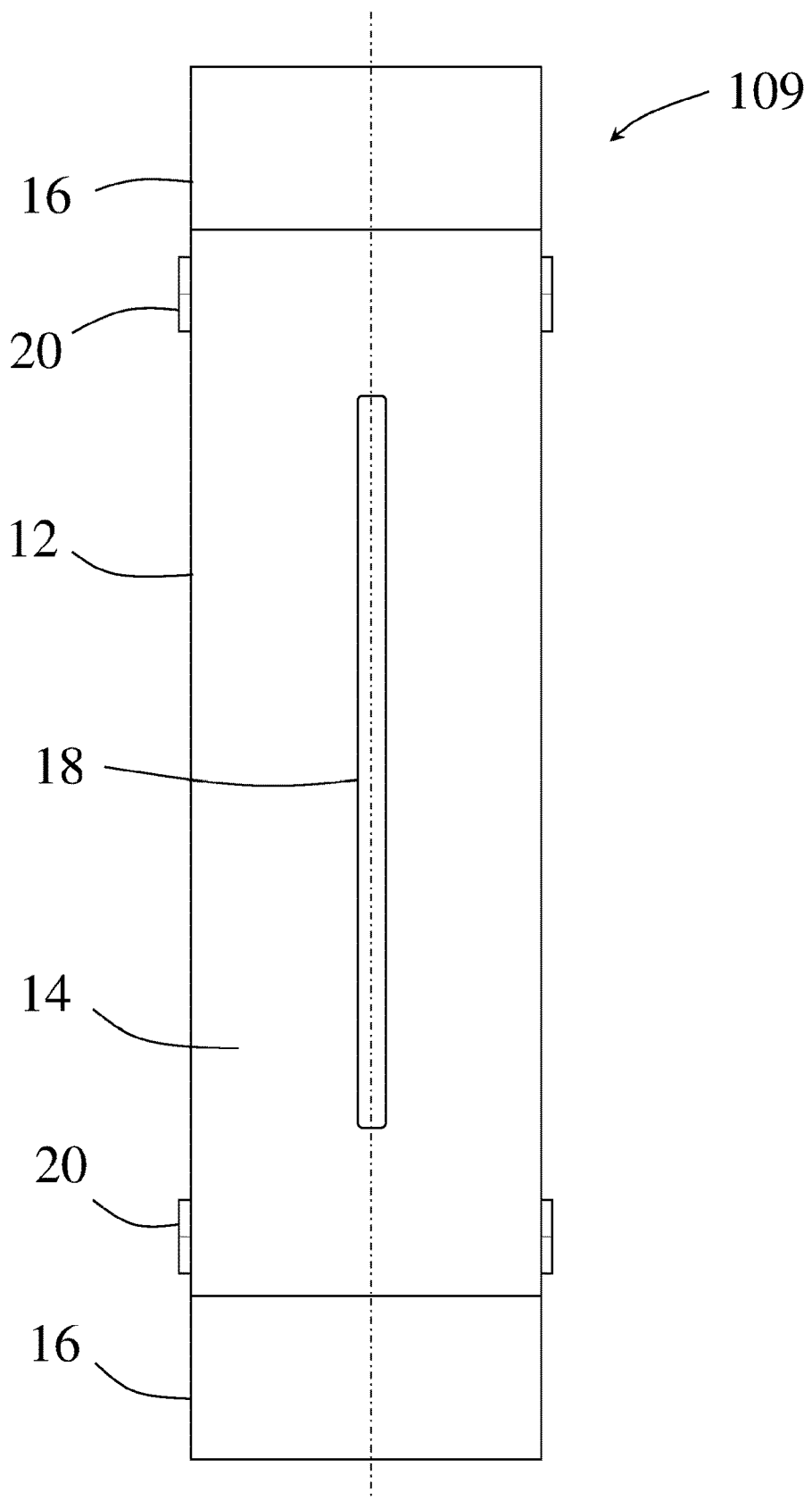

Attention is drawn to FIG. 10 schematically illustrating a generator 109 in accordance with an embodiment of the present invention that may be used in a system such as system 100 in FIG. 1 or systems generally like it. Generator 109 in this embodiment may have a structure generally similar to generator 100 with the magnets, here two, being located at opposing axial sides of the UV light source possibly formed about axis X. The magnets 20 of this embodiment in one example may be formed on an outer side of sleeve 12 for example as coils of an electro magnet. In another example, the magnets 20 of this embodiment may be formed as segments forming part of the sleeve that are magnetized. Such segments may be separate segments machined to have their appropriate structure for connecting to the sleeve and then magnetized.

An incoming oxygen containing gas entering generator 109 flows passed magnets 20 and the UV source 18 consequently being irradiated with UV radiation within an induced magnetic field to form a treated oxygen containing gas flow that exits generator 109 for treating a body of matter.

It is to be understood that various magnet configurations may be present in generator embodiments of the invention. For example a generator embodiment may include at least one magnet located within space 14 and another magnet located within a lid, or one magnet at an outer side of a lid and another magnet within a deep recess 25, (etc.).

Figure 11:
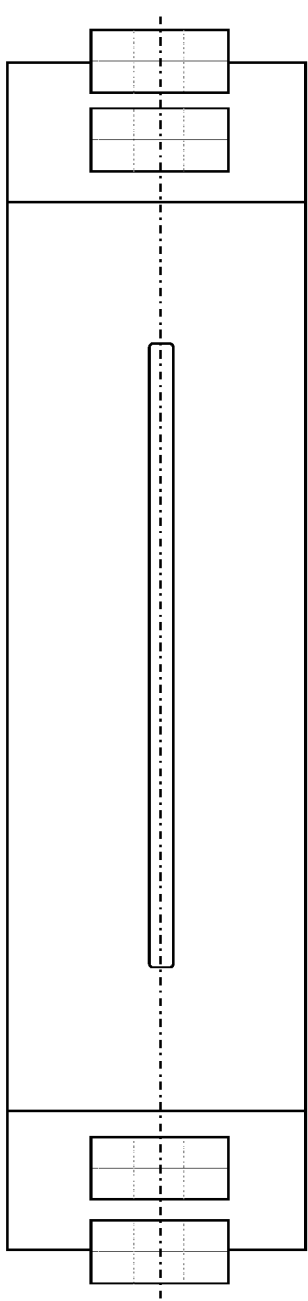
Figure 12:
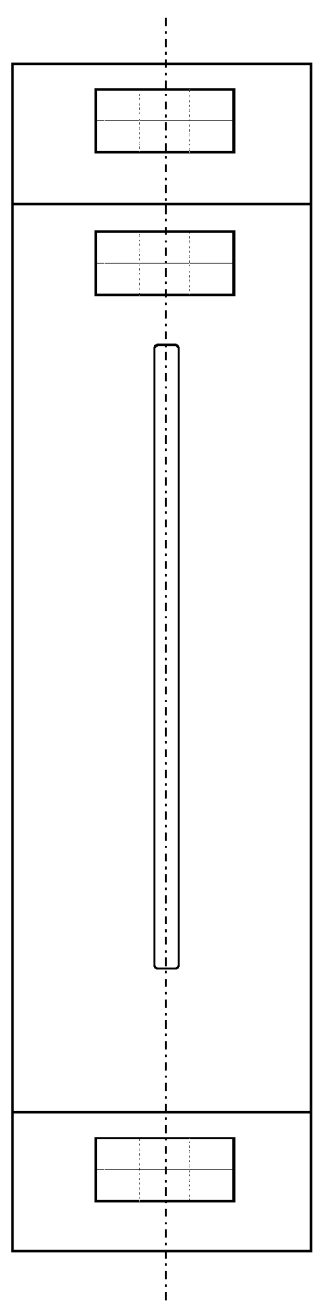
Figure 13:
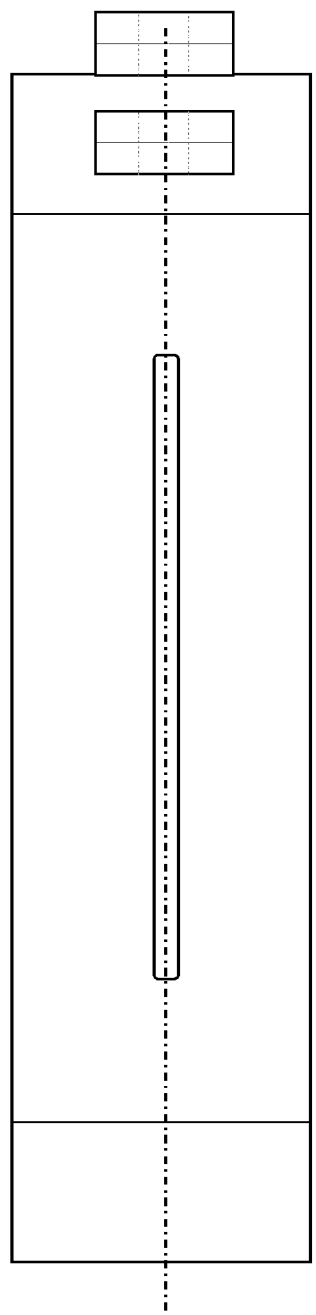

With attention drawn to FIGS. 11 to 12 generator embodiments including more than two magnets are illustrated, with the magnets being shown in exemplary locations from the various magnet locations discussed herein above. FIG. 13 illustrates a generator embodiment showing magnets located on one axial side of the UV source.

Figure 14:
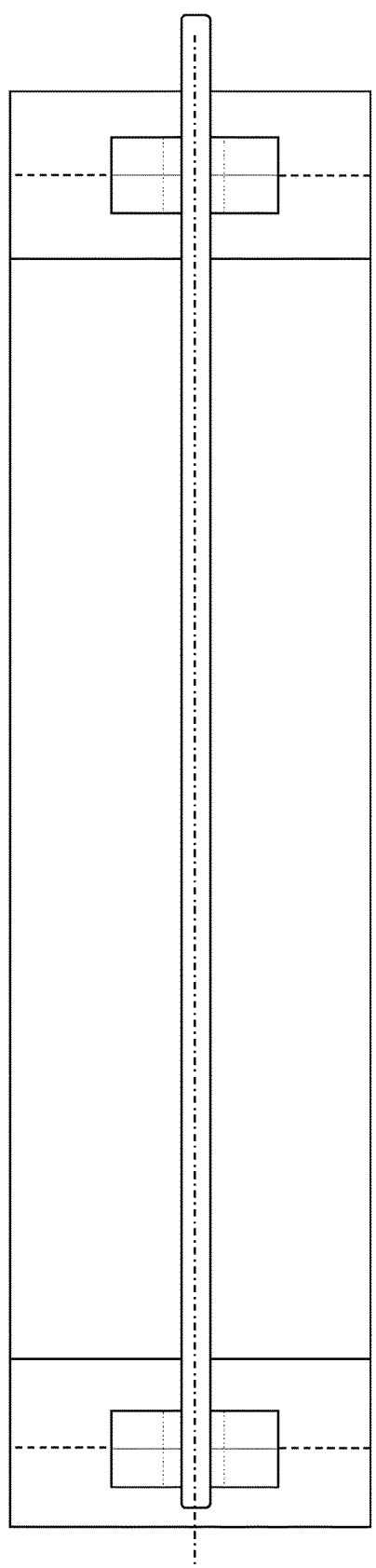
Figure 14:
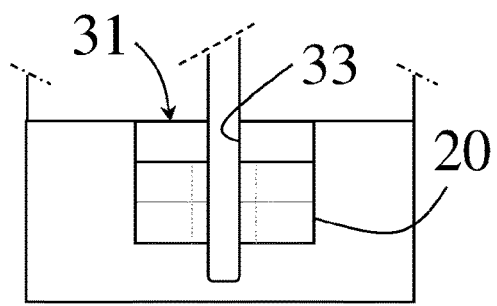

FIG. 14 illustrates a generator embodiment where a top end or tip (possibly plastic end) of the UV source protrudes out from the sleeve and lid. Here, only a small portion of the UV lamp's housing tip protrudes while the rest of the lamp remains within the sleeve. Possibly, this upper tip is configured to attach to electric circuitry providing electrical current (etc.) for operation of the UV source. Such configuration has been found to simplify and ease assembly and maintenance of the generator while not hindering its operation and/or efficiency.

As seen in the lower right side of this figure, the UV source possibly protrudes into the lower magnet 20 located along this generator's axis (possibly into a central bore within said magnet) while first passing through a cap 31 of the lower lid located between magnet 20 and the inner space of the sleeve. Cap 31 may be configured to have an internal through going hole/cavity 33 that snuggly fits the UV source for supporting the UV source within the sleeve.

Consequently, an assembly of the generator embodiment seen in FIG. 14 may be accomplished by inserting the UV source via a hole in the upper lid passed the inner space of the sleeve and into hole 33 of cap 31, which supports the UV source in its upright position here seen. Such assembly may also be accomplished by keeping the upper lid open, inserting the UV source so its lower end fits within hole 33 (and possibly magnet 20 as here seen) and then closing the upper lid over the UV source. Although here the magnets are seen in the lids, such "protruding" configuration of the UV source may be used with various locations of the magnets within the generator as e.g. illustrated hereinabove and below.

Figure 15:
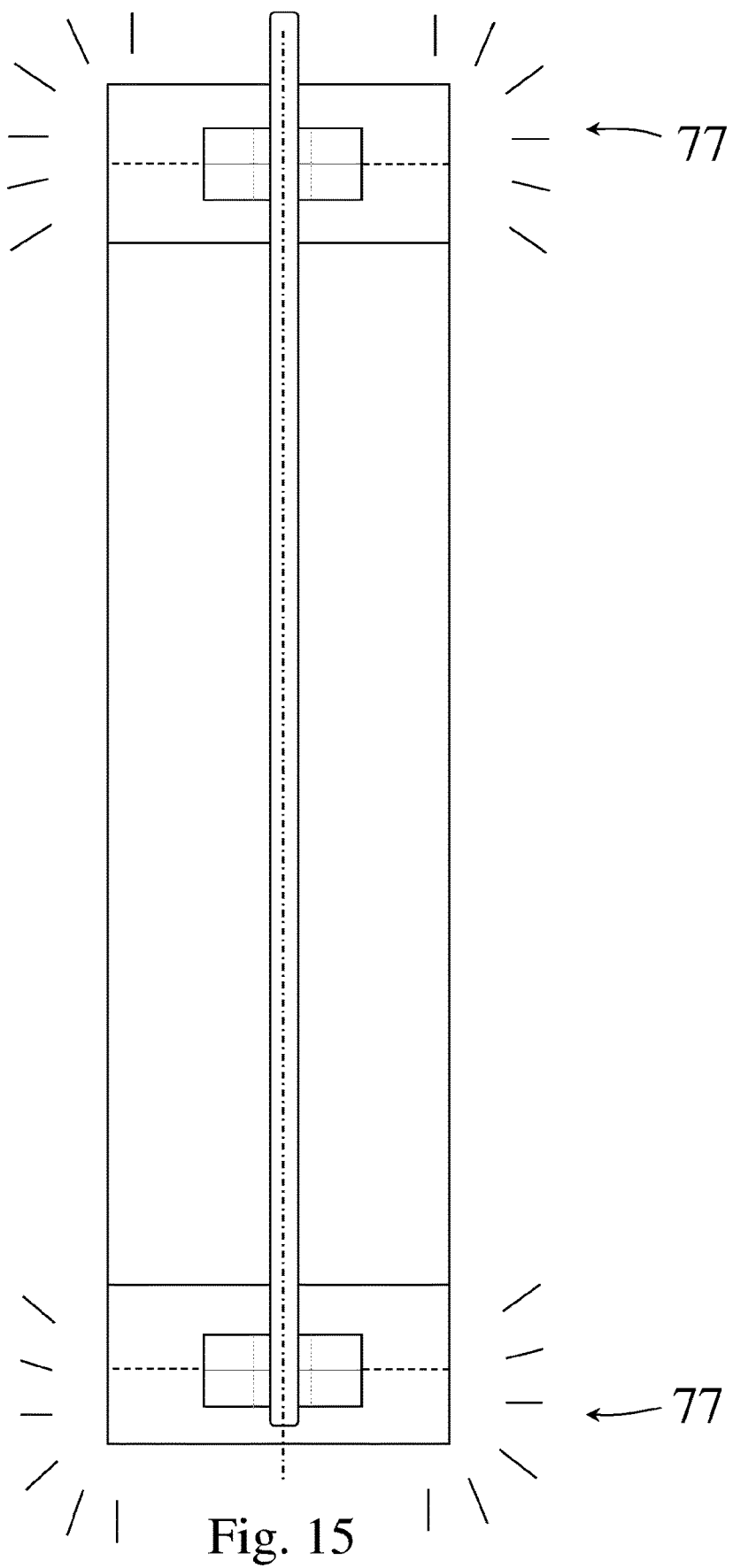

Attention is drawn to FIG. 15 schematically showing a generator according to an embodiment of the invention. The generator in this embodiment is seen emitting light 77, here through the lids located at each end of the generator's sleeve. Said emitted light 77 originating in this case from the UV source located within the sleeve, which is able to pass out of the sleeve, here as a blue glow, via the at least partially transparent material of the lid (e.g. plastics and/or thermoplastics materials e.g. polyvinyl chloride (PVC), polyamide compounds (e.g. akulon trade name), synthetic polymers (e.g. delrin trade name), or the like).

In an aspect of the invention, said emitted light 77 may serve as an indication, for example, that the generator is operating. Such indication may be used e.g. as an alarm or an alert for maintenance required in the generator during use e.g. in the case that the light ceases to be emitted and/or flickers on and off.

Figure 16:
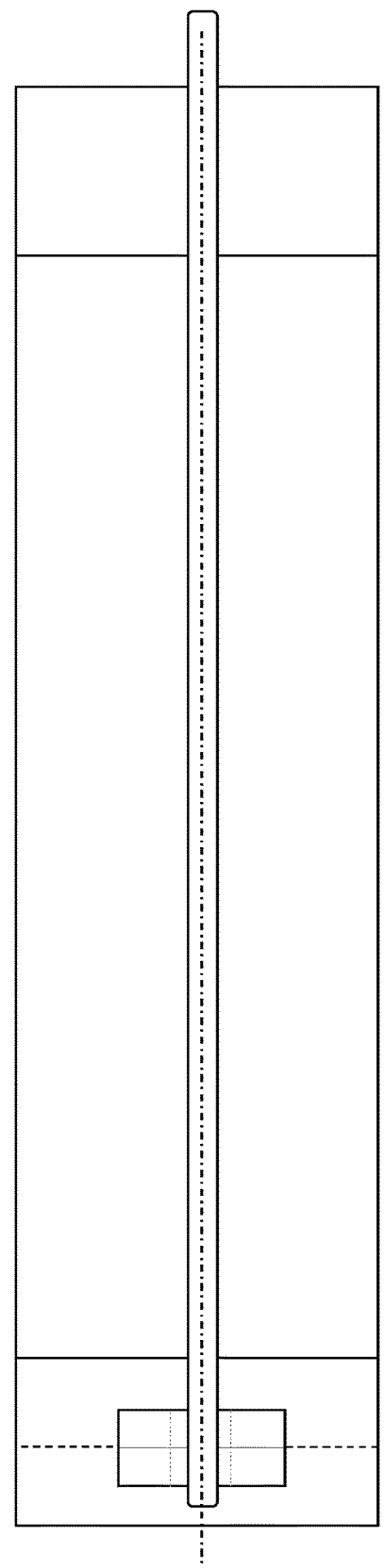

Attention is drawn to FIG. 16 schematically showing a generator according to an embodiment of the invention. This generator may be generally similar to that shown in preceding figures such as in FIG. 14, however exemplifying a possibility of including only one single magnet located along the axis. Here the magnet is located as a lower side of the generator, possibly formed about and/or adjacent where the treated flow exists the generator towards the body of matter to be treated. However, other locations for the magnet such as at or adjacent the upper lid may be possible.

Figure 17:
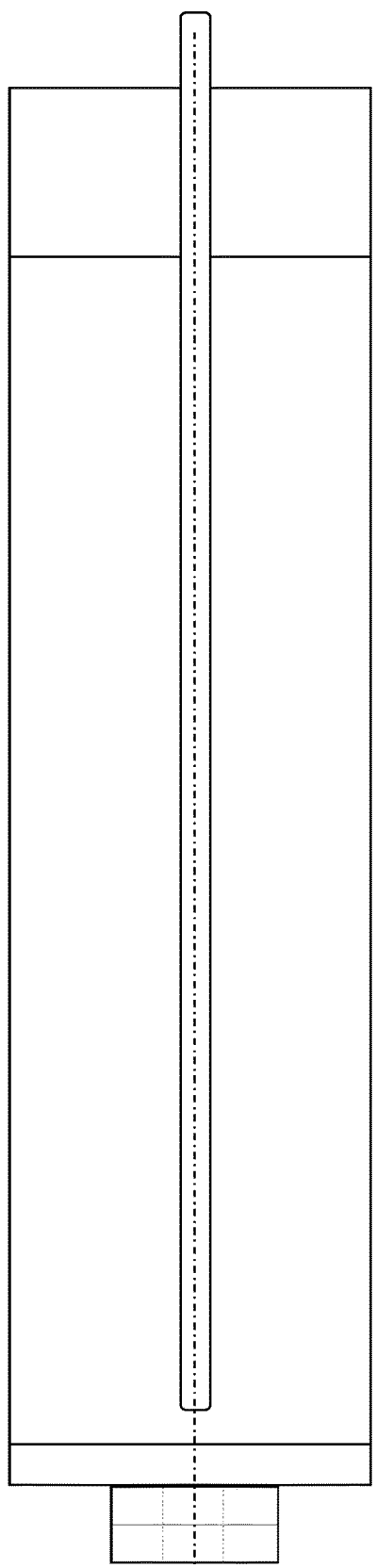

Attention is drawn to FIG. 17 schematically showing a generator according to an embodiment of the invention having only one single removable/detachable lid (see top of generator), while the other end of the sleeve (here lower end) being closed by a cap, possibly fixedly attached to said end, further possibly being an integral part of the sleeve (maybe from same or other material as the sleeve). Although here only one single magnet is illustrated, more than one, possibly two or more magnets may be provide in various embodiments.

In the following, three examples to treatment on a body of matter by generators according to various embodiments of the invention (such as the generator seen in FIG. 14) will be discussed. In these examples, the treated body of matter is a 5 liter container filled with tap water and the generator includes a GPH 357 T5 VH4 UV ultraviolet lamp and a SURELIGHT 10-05-04B ballast both by Atlantic Ultraviolet USA, and two cylindrically shaped neodymium (Neodymium-Iron-Boron) grade N52 magnets each one located at a respective one of the lids of the generator. Furthermore the generator being configured to produce a flow rate of 5 liters per minute of treated oxygen containing gas into the body of matter.

Example 1: a tested container was contaminated with $E.$ $Coli$ at a level of $4.2\times10^5$ CFU per 100 milliliters. At certain time intervals, the level of contamination of the tap water in the container was tested using the MF/SM—9222 G method. After 10 minutes from initial contamination the level of contamination dropped to 6 CFU per 100 milliliters, after 20 minutes from initial contamination to 2 CFU per 100 milliliters and after 60 minutes from initial contamination to below 1 CFU per 100 milliliters.

Example 2: a tested container was contaminated with $Pseudomonas\ aeruginosa$ at a level of $1.5\times10^5$ CFU per 100 milliliters. At certain time intervals, the level of contamination of the tap water in the container was tested using the MF/SM—9213 E method. After 10 minutes from initial contamination the level of contamination dropped to 186 CFU per 100 milliliters, after 20 minutes from initial contamination to 125 CFU per 100 milliliters and after 60 minutes from initial contamination to 17 CFU per 100 milliliters.

Example 3: a tested container was contaminated with $Staphylococcus\ aureus$ at a level of $2.1\times10^5$ CFU per 100 milliliters. At certain time intervals, the level of contamination of the tap water in the container was tested using the MF/SM—9213 B method. After 10 minutes from initial contamination the level of contamination dropped to 18 CFU per 100 milliliters, after 20 minutes from initial contamination to 14 CFU per 100 milliliters and after 60 minutes from initial contamination to below 1 CFU per 100 milliliters.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A generator for producing a treated oxygen containing gas for treating a body of matter, the generator extending along a generator axis and comprising:
   an axially extending hollow sleeve defining an internal space,
   at least one lid located at one of the axial ends of the sleeve, each lid having a recess sandwiched between two parts of the lid,
   a UV light source located along the axis, and
   at least one magnet located along the axis such that, for each lid, one magnet is fixed in the recess of that lid, and the thickness of the lid along the axis from the magnet to the internal space is less than the thickness of the lid along the axis from the magnet away the internal space.

2. The generator of claim 1, wherein the internal space defines a flow path, and oxygen containing gas entering the generator flows via the flow path to be irradiated with UV radiation emitted by the UV light source in the presence of an induced magnetic field from the at least one magnet to form the treated oxygen containing gas exiting the generator for treating the body of matter.

3. The generator of claim 2, wherein the UV light source extends along the axis.

4. The generator of claim 3, wherein the at least one lid is two lids, and each axial end of the sleeve is closed by a respective lid, thereby placing magnets at both axial ends of the light source.

5. The generator of claim 4, wherein the sleeve being formed from metallic material and the lids from non-metallic material.

6. The generator of claim 5, wherein the body of matter is at least one of: a fluid and a solid.

7. The generator of claim 1, wherein at least one the lids being at least partially transparent to permit at least some light from the UV light source to pass through it.

8. A system for treating a body of matter, the system comprising:
   at least one generator, each generator extending along a generator axis and comprising having:
   an axially extending hollow sleeve defining an internal space,
   at least one lid located at one of the axial ends of the sleeve, each lid having a recess sandwiched between two parts of the lid,
   a UV light source located along the axis, and
   at least one magnet located along the axis such that, for each lid, one magnet is fixed in the recess of that lid, and the thickness of the lid along the axis from the magnet to the internal space is less than the thickness of the lid along the axis from the magnet away the internal space.

9. The system of claim 8, wherein the at least one generator is a plurality of generators.

10. The system of claim 9, wherein the plurality of generators are configured in the system with their respective axes being parallel.

11. A method for producing a treated oxygen containing gas for treating a body of matter comprising the steps of:
    providing a generator extending along an axis, the generator having:
    an axially extending hollow sleeve defining an internal space,
    at least one lid located at one of the axial ends of the sleeve, each lid having a recess sandwiched between two parts of the lid,
    a UV light source located along the axis, and
    at least one magnet located along the axis such that, for each lid, one magnet is fixed in the recess of that lid, and the thickness of the lid along the axis from the magnet to the internal space is less than the thickness of the lid along the axis from the magnet away the internal space,
    directing an oxygen containing gas through the internal space to be irradiated with UV radiation emitted by the UV light source in the presence of an induced magnetic field from the at least one magnet to form the treated oxygen containing gas, and
    directing the treated oxygen containing gas into a body of matter.

12. The method of claim 11, wherein the UV light source extends along the axis.

13. The method of claim 12, wherein the at least one lid is two lids, and each axial end of the sleeve is closed by a respective lid, thereby placing magnets at both axial ends of the light source.

14. The method of claim 11, wherein the sleeve being formed from metallic material and the lids from non-metallic material.

15. The method of claim 14, wherein the body of matter is at least one of: a fluid and a solid.

16. The method of claim 11, wherein at least one the lids being at least partially transparent to permit at least some light from the UV light source to pass through it and during production of the treated oxygen containing gas the lids glow.

* * * * *